з,361,702
Patented Jan. 2, 1968

3,361,702
ETHYLENE-ACRYLIC ACID COPOLYMERS
PLASTICIZED WITH POLYOLS
Lloyd H. Wartman, Charleston, W. Va., and Clarence E. Roth, Jr., Orange, Tex., assignors to Union Carbide Corporation, a corporation of New York
No Drawing. Filed Oct. 22, 1965, Ser. No. 502,569
14 Claims. (Cl. 260—33.2)

This application is a continuation-in-part of application Ser. No. 312,005, filed Sept. 27, 1963, and now abandoned.

This invention relates to plasticized copolymers of ethylene-acrylic acid, ethylene methacrylic acid and their respective ionomers, i.e., the salts derived from these copolymers. In one aspect the present invention relates to plasticized compositions of said copolymers and their ionomers which are generally characterized by having higher melt index, lower stiffness, easier processability, lower glass transition temperature (Tg) and higher resiliency than the corresponding unplasticized copolymers or their ionomers. In another aspect, the present invention is directed to plasticized compositions of said copolymers and their respective ionomers which generally have highly improved anti-static properties in comparison with the corresponding unplasticized copolymers and their ionomers.

The production of low-stiffness polyethylene by the basic high temperature, high pressure polymerization of ethylene is described in U.S. 2,153,553. The stiffness of the resulting polyethylene is low, of the order of about 20,000 p.s.i., or lower, in contrast to the polyethylene which is produced by the low temperature, low pressure polymerization of ethylene, which has a stiffness as high as about 160,000 p.s.i., or even higher.

Low stiffness polyethylene has found numerous applications such as, for example, in the production of laminated plastics, flexible films, wrapping films, squeeze bottles, containers, molded and extruded articles. In great many instances it is desirable to employ polyethylene or "polyethylene-like" plastic compositions which have even lower stiffness, and which are considerably more resilient and are more readily processable than the polyethylene which is produced by high temperature, high pressure polymerization of ethylene. In still other applications it is desirable to employ polyethylene or "polyethylene-like" plastic compositions which are virtually free from static electricity and which at the same time may have lower stiffness, lower Tg, higher melt index and higher resiliency than polyethylene.

Attempts to plasticize polyethylene itself have been unsuccessful due to the incompatibility of known plasticizers with polyethylene and exudation or so-called "sweat-out" of the plasticizers from the resin, upon standing, even at room temperature. Copolymerization of ethylene with a host of monomeric organic compounds has provided a partial solution to this problem but this method has several deficiencies. For example, in the case of copolymers of ethylene and acrylic acid, large quantities of acrylic acid are required to produce a copolymer which has the requisite low degree of stiffness and high resiliency. In view of the inherent difficulties associated with copolymerization processes, increased comonomer concentration results in decreased productivity of a given polymerization reactor, hence lowering the yield of the copolymer. Furthermore, acrylic acid is considerably more expensive than ethylene, consequently, the resulting copolymer is produced at a cost too high for many industrial applications involving the use of these copolymers.

It has now been discovered that copolymers of ethylene and acrylic acid, copolymers of ethylene and methacrylic acids, the ionomers derived from copolymers of ethylene and acrylic acid and the ionomers of ethylene and methacrylic acid can be plasticized to produce homogeneous "polyethylene-like" plastic compositions which do not have the deficiencies known to be present in the plasticized polyethylene compositions which have heretofore been available. Furthemore, the resulting homogeneous plasticized copolymers and their respective ionomers in general are more readily processable due to their higher melt indices, have lower stiffness, higher resiliency, lower Tg and improved electrostatic properties than the corresponding unplasticized copolymers and their respective ionomers.

According to this invention, the copolymer (or the ionomer) and the plasticizer are admixed by known means, such as on a two-roll mill, a banbury mixer, etc., for a sufficient period of time to insure complete incorporation and uniform distribution of the plasticizer in the copolymer so as to produce a homogeneous composition. If desired, the mixture may be heated to accelerate the blending of the plasticizer and the copolymer.

The use of the plasticizers of this invention generally lowers the stiffness of the resulting plasticized copolymer (or ionomer), lowers its Tg, increases its resiliency, increases its melt index and improves its electrostatic property without the need for using large quantities of the comonomer (acrylic acid and methacrylic acid) for producing the copolymer, therefore obviating the foregoing limitations.

It should be noted that not all the plasticizers of this invention result in all the improvements described herein. For example, some plasticizers may have little or no effect upon the stiffness and resiliency of a particular copolymer or ionomer while at the same time, they lower the Tg, improve processability and impart anti-static properties to the resulting plasticized copolymer or plasticized ionomer. On the other hand, other plasticizers may have little or no effect on the processability of the resins but may have significant effect upon their resiliency, Tg and anti-static properties. Judicious selection of the plasticizers will therefore afford a latitude in achieving the desired changes in properties.

The copolymers which can be plasticized by the plasticizers of this invention to produce "polyethylene-like" plastic compositions having the aforementioned improved properties are copolymers of ethylene and methacrylic acid and copolymers of ethylene and acrylic acid. The concentration of the comonomer (acrylic or methacrylic acid) in these copolymers can vary from about 1 to about 35, preferably from about 5 to about 20 weight percent based on the copolymer, the remainder being copolymerized ethylene.

It has been further discovered that the plasticizers of this invention are effective in plasticizing the ionomers of the above-mentioned copolymers and that the resulting plasticized ionomers are essentially free from static electricity. Furthermore, these plasticized ionomers generally exhibit higher melt index, high resiliency, lower Tg and lower stiffness than the corresponding unplasticized copolymers.

The ionomers (ionic copolymers) are obtained by the reaction of the copolymer base with an ionizable metal compound. This reaction is well known in the art and is referred to as "neutralization."

The ionomers of particular interest in this invention are those in which at least about 5 percent, preferably from about 20 to about 60 percent of the acid groups have been neutralized.

The metal ions which are suitable in forming the ionic copolymers which are plasticized in this invention are the monovalent, divalent and trivalent metals of Groups I, II, III, IV–A and VIII of the Periodic Table of Elements. Suitable monovalent metal ions are $Na^+$, $K^+$, $Li^+$, $Cs^+$, $Rb^+$, $Ag^+$, $Hg^+$, and $Cu^+$. Suitable divalent metal ions are $Be^{+2}$, $Mg^{+2}$, $Ca^{+2}$, $Sr^{+2}$, $Ba^{+2}$, $Cu^{+2}$, $Cd^{+2}$, $Hg^{+2}$, $Sn^{+2}$, $Pb^{+2}$, $Fe^{+2}$, $Co^{+2}$, $Ni^{+2}$ and $Zn^{+2}$. Suitable trivalent metal ions are $Al^{+3}$, $Sc^{+3}$, $Fe^{+3}$ and $Y^{+3}$.

The preferred metals are the alkali metals specifically $Li^+$, $Na^+$, $K^+$, and alkaline earth metals of Group II, preferably $Mg^{++}$, $Ca^{++}$ and $Zn^{++}$. Furthermore, it is not essential that only one metal ion be employed in the formation of the ionic copolymer. More than one metal ion may be preferred in certain applicaions.

One class of plasticizers which can be employed in the present invention is the diols represented by the formula:

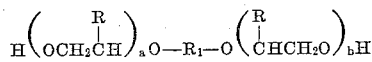

wherein $R_1$ is an alkylene radical having 2 to 6 carbon atoms, preferably 2 to 3 carbon atoms, R is hydrogen atom or a lower alkyl radical, $a$ and $b$ integers each varying from 0 to about 250, wherein $a$ and $b$ are not necessarily equal. Exemplary diols are polyethylene glycols having molecular weights of at least about 200, preferably from about 300 to about 25,000, and polypropylene glycols with molecular weight of at least about 200, preferably from about 300 to about 25,000.

Another class of plasticizers suitable for plasticizing the above copolymers and their ionomers is the triols represented by the formula:

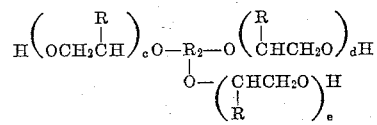

wherein $R_2$ is a trivalent saturated aliphatic radical having 3 to 8 carbon atoms, preferably 3 to 6 carbon atoms, R is a hydrogen atom or a lower alkyl radical, $c$, $d$ and $e$ are integers varying respectively from 0 to about 25, preferably from 0 to about 17, and wherein $c$, $d$ and $e$ are not necessarily equal. Exemplary triols are glycerol ($c$, $d$ and $e$ being all zero) and the hexane triols such as, for example, 1,2,6-hexanetriol. Furthermore, the R's in this general formula need not be identical to each other.

A third class of plasticizers which can be employed are tetrols, which can be represented by the general formula:

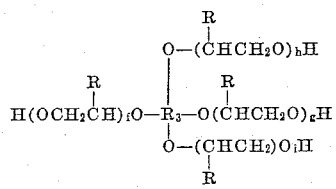

wherein $R_3$ is a tetravalant saturated aliphatic radical containing 5 to 8 carbon atoms, preferably 5 carbon atoms, R is a hydrogen atom or a lower alkyl group, $f$, $g$, $h$, and $i$ are integers varying respectively from 0 to about 15, preferably from 0 to about 10, wherein $f$, $g$, $h$ and $i$ are not necessarily equal, and wherein at least one of said integers is greater than zero.

An exemplary tetrol is pentaerythritol to which the least one mole of ethylene oxide has been added.

Still another class of plasticizers which are effective in this invention are the hexols represented by the formula:

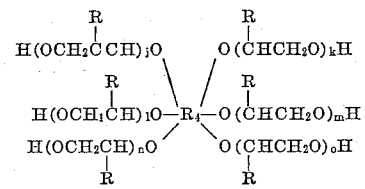

wherein $R_4$ is a hexavalent saturated aliphatic radical containing six carbon atoms and R is a hydrogen atom or a lower alkyl group, $j$, $k$, $l$, $m$, $n$ and $o$ are all integers varying respectively from 0 to 12, preferably from 0 to 9, and wherein said integers are not necessarily equal. Thus it can be seen that when $R_4$ contains six carbon atoms and all said integers are zero, the hexol plasticizer is sorbitol.

Another class of plasticizers which is effective in plasticizing the copolymers and ionomers of this invention is the alkyl phosphates having the general formula:

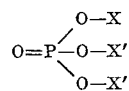

wherein X is an alkyl group containing 4 to 12 carbon atoms and X' represents an alkyl group containing 4 to 12 carbon atoms; aryl groups containing up to 10 carbon atoms, such as phenyl and naphthyl; alkaryl groups such as, for example, alkyl-substituted naphthalene and alkyl-substituted benzene, wherein said naphthalene and benzene are substituted in at least one position and wherein said alkyl substituent contains 1 to 8 carbon atoms; aralkyl radical such as, for example, benzyl; cycloalkyl group containing 3 to 8 carbon atoms such as, for example, cyclopropyl, cyclopentyl, cyclohexyl, cycloheptyl, etc. Both X"s need not be identical as one X' may, for example, represent an alkyl group and the other may be a phenyl group; or one X' may represent an alkyl group containing 7 carbon atoms while the other may be an alkyl group containing say, 4 carbon atoms.

With respect to the foregoing plasticizers it should be pointed out that they are generally characterized by their unexpected high degree of compatibility with the above-mentioned copolymers and ionomers, and their stability and non-volatility from the plasticized copolymer composition. The choice as well as the quantity of plasticizer which is used depend, inter alia, upon the concentration of the comonomer in the copolymer, the degree of compatibility of the plasticizer with the copolymer, the chemical composition of the plasticizer, the desired stiffness and glass transition temperature of the plasticized copolymer. A judicious selection of the particular plasticizer, therefore, depends upon the foregoing considerations and can be readily determined by one skilled in the art from the teachings herein. It is, of course, preferable to use a plasticizer which is highly compatible with the particular copolymer of ethylene and which produces the desired results when used in relatively small concentrations. In most cases the concentration of the plasticizer can vary from about 2 to about 40 phr. (parts plasticizer per 100 parts resin), preferably from about 5 to about 30 phr.

Although the plasticizer and the copolymer can be blended at ambient temperatures, slightly elevated temperatures, say about 50° C. to 150° C. are preferred to obtain a homogeneous composition. For example, blending on a two-roll mill which had been heated to about 120° C. results in a plasticized copolymer composition which is less opaque than a similar plasticized composition which has been blended on a two-roll mill at ambient temperatures.

The following examples illustrate the methods of preparing plasticized compositions of ethylene acrylic acid copolymers. The properties of the plasticized copolymer compositions together with the corresponding properties of the unplasticized copolymer (control sample) are shown in Table I which follows these examples.

*Example 1*

A mixture consisting of a copolymer of ethylene and acrylic acid containing 15 weight percent of polymerized acrylic acid and 20 parts of octyl diphenyl phosphate plasticizer per 100 parts of the copolymer was blended to produce a homogeneous plasticized composition as follows:

The copolymer was first fluxed on a two-roll mill which had been heated to 120° C. After a period of approximately two minutes the plasticizer was added and fluxed with the copolymer until the plasticizer was completely mixed with and incorporated into the copolymer, as determined visually. The plasticized copolymer composition was then stripped from the mill and its properties determined. The physical properties of the compositions are shown in Table I.

*Example 2*

The procedure of Example 1 was followed using a copolymer of ethylene and acrylic acid containing 25 weight percent polymerized acrylic acid and 20 parts of tri(2-ethylhexyl) phosphate plasticizer per 100 parts of the copolymer. The product obtained was a homogeneous mixture of plasticized ethyleneacrylic acid copolymer.

*Example 3–5*

The procedure of Example 1 was followed using a copolymer of ethylene and acrylic acid containing 13 weight percent polymerized acrylic acid and 1 phr. of the following plasticizers respectively: Polyethylene glycol of an average molecular weight of 20,000, polypropylene glycol of an average molecular weight of 425, and polypropylene glycol of an average molecular weight of 2025. The physical properties of the resulting compositions are shown in Table I.

of propylene oxide and glycerol, and 50 mole adduct of propylene oxide and glycerol. The physical properties of the resulting compositions are also shown in Table I below.

*Example 9*

The procedure of Example 1 was followed using a copolymer of ethylene and acrylic acid containing 17 percent by weight of polymerized acrylic acid and 20 phr. of a pentol plasticizer which was 17.6 mole adduct of propylene oxide and diethylenetriamine. The physical properties of the resulting composition are shown in Table I below.

*Example 10*

The procedure of Example 1 was followed using a copolymer of ethylene and acrylic acid containing 17 percent by weight of polymerized acrylic acid and 20 phr. of a hexol plasticizer which was a 35.5 mole adduct of propylene oxide and sorbitol. The physical properties of the resulting composition are also shown in Table I.

*Example 11*

The procedure of Example 1 was followed using a copolymer of ethylene and acrylic acid containing 13 percent by weight polymerized acrylic acid and 20 phr. of sorbitol. The physical properties of the resulting composition are also shown in Table I.

TABLE I

| Example | Acrylic Acid in Copolymer, wt. percent | Plasticizer Name | Plasticizer Quantity, phr. | Tensile Strength, p.s.i.[1] | Elongation, percent[2] | Stiffness, p.s.i.[3] | Tensile Impact[4] | Melt Index dg./min.[5] | Sweatout[6] |
|---|---|---|---|---|---|---|---|---|---|
| Control | 15 | | | 2,920 | 540 | 10,000 | 330 | 95 | |
| 1 | 15 | Octyl diphenyl phosphate | 20 | 1,355 | 400 | 4,800 | 502 | 150 | None. |
| Control | 24 | | | 1,825 | 360 | 6,300 | 310 | 150 | |
| 2 | 24 | Tri(2-ethylhexyl)phosphate | 20 | 980 | 320 | 5,400 | 503 | | Do. |
| Control | 13 | | | 3,185 | 530 | 10,900 | 480 | 27 | |
| 3 | 13 | Polyethylene glycol[7] | 10 | 3,580 | 70 | 10,600 | 475 | 22 | Do. |
| 4 | 13 | Polypropylene glycol[8] | 10 | 1,810 | 514 | 6,800 | 460 | 56 | Do. |
| 5 | 13 | Polypropylene glycol[9] | 10 | 2,030 | 550 | 8,000 | 455 | 47 | Do. |
| Control | 11 | | | 2,590 | | 10,000 | 387 | 145 | |
| 6 | 11 | 50 mole adduct of propylene oxide and glycerol. | 20 | 1,450 | | 5,460 | 388 | 140 | Do. |
| Control | 24 | | | 1,500 | | 6,000 | 300 | 1,000 | |
| 7 | 24 | 3 mole adduct of propylene oxide and glycerol. | 30 | 400 | | 1,110 | 360 | 2,000 | Do. |
| 8 | 24 | 50 mole adduct of propylene oxide and glycerol. | 20 | 945 | | 1,820 | 390 | 2,000 | Do. |
| Control | 17 | | | 2,120 | 370 | 10,100 | 260 | 200 | |
| 9 | 17 | 17.6 mole adduct of propylene oxide and diethylenetriamine. | 20 | 1,230 | 460 | 4,830 | 300 | 376 | Do. |
| 10 | 17 | 35.5 mole adduct of propylene oxide and sorbitol. | 20 | 729 | 175 | 3,860 | 280 | 307 | Do. |
| Control | 13 | | | 2,980 | 590 | 11,000 | 357 | 48 | |
| 11 | 13 | Sorbitol | 20 | 2,530 | 475 | 896 | 545 | 39 | Do. |

[1] ASTM Test D638-58T.
[2] ASTM Test D638-58T.
[3] ASTM Test D882-56T.
[4] Modified ASTM Test D1822-61T.
[5] ASTM Test D1238-62T (modified as discussed after this table).
[6] Observed after ageing for 2 weeks at room temperature of about 25° C.
[7] Average molecular weight of 20,000.
[8] Average molecular weight of 425.
[9] Average molecular weight of 2,025.

*Example 6*

The procedure of Example 1 was followed using a copolymer of ethylene and acrylic acid containing 11 weight percent polymerized acrylic acid and 20 phr. of a 50 mole adduct of propylene oxide with glycerol as plasticizer. The physical properties of the resulting composition are shown in Table I.

*Examples 7–8*

The procedure of Example 1 was followed using a copolymer of ethylene and acrylic acid containing 24 weight percent polymerized acrylic acid and 30 phr. and 20 phr. respectively of the following plasticizers: 3 mole adduct The tensile impact test was essentially similar to ASTM Test D-1822-61T. The only difference was that instead of placing the test specimen on the head of the arm employed in the ASTM method, and allowing said arm to swing against a fixed object, thereby measuring the force of impact, in the method employed herein the specimen was located in place of said fixed object and a weight was placed on the head of said arm which was allowed to swing freely against the specimen, thereby measuring the force of impact as in the ASTM method.

The data in Table I clearly establishes that the plasticized copolymer compositions of this invention are more resilient and have lower stiffness than the corresponding unplasticized copolymer. Furthermore, the plasticized copolymer compositions of this invention have lower glass transition temperature than the corresponding unplasticized composition. Example 11A below illustrates the effect of plasticization of the copolymer upon the glass transition temperature.

*Example 11A*

The procedure of Example 1 was followed using a copolymer which contained 24 weight percent polymerized acrylic acid and the plasticizer of tri(2-ethylhexyl) phosphate, used in the amount equal to 20 p.h.r. The glass transition temperature of the plasticized copolymer was $-5°$ C., as compared to the glass transition temperature of $27°$ C., for the unplasticized ethylene acrylic acid copolymer.

The adhesive characteristics of the plasticized copolymers of ethylene and acrylic acid, even at low glass transition temperatures, suggests the application of these plasticized copolymer composition as interlayers in the manufacture of safety glass. This is particularly so since the plasticized copolymer compositions of this invention retain their adhesiveness for a long period of time as compared to the unplasticized copolymer.

Still another class of plasticizers which can be employed in the present invention are the adducts of alkylene oxide with various amines. The alkylene oxide can be represented by the general formula:

$$\underset{\underset{R'}{|}}{CH_2 - CH} \overset{O}{\diagdown\diagup}$$

wherein $R'$ is hydrogen or an alkyl group containing 1 to 10 carbon atoms preferably 1 to 4 carbon atoms. Where $R'$ is hydrogen, the corresponding alkylene oxide is ethylene oxide. Also where $R'$ is methyl, ethyl, propyl or isopropyl, the corresponding oxides are propylene oxide, butylene oxide and pentylene oxide, respectively, etc.

The amines which are employed in the preparation of the adducts are: primary amines which can be represented by the general formula $R''-NH_2$, where $R''$ is branched or straight chain alkyl group containing 1 to about 18 carbon atoms, preferably 1 to about 12 carbon atoms, or $R''$ can be aryl, alkaryl, or aralkyl group containing up to about 10 carbon atoms; secondary amines which can be represented by the general formula $$\underset{R''''}{\overset{R'''}{\diagdown}}NH$$

wherein $R'''$ and $R''''$ each represents an alkyl moiety, branched or linear, which contains 1 to about 12 carbon atoms, preferably 1 to 8 carbon atoms, or they can be aryl, alkaryl or aralkyl group containing up to about 10 carbon atoms. Furthermore $R'''$ and $R''''$ are not necessarily the same moiety; alkylene diamines represented by the formula $H_2NC_nH_{2n}NH_2$ wherein $n$ is an integer varying from 1 to 8, preferably from 1 to 6, and alkylene polyamines conforming to the general formula:

$$H_2N(C_AH_{2A}NH)_BH$$

wherein A is also an integer varying from 1 to 8, preferably from 1 to 6 and B is an integer varying from 2 to 6, preferably from 2 to 4.

In the case of adducts of alkylene oxide with primary amines the resulting adduct is produced in conformity with the following reaction:

$$R''NH_2 + \underset{\underset{R'}{|}}{CH_2 - CH}\overset{O}{\diagdown\diagup} \longrightarrow R''N\underset{\underset{\underset{R'}{|}}{CH_2CHOH}}{\overset{\overset{\overset{R'}{|}}{CH_2CHOH}}{\diagup}}\diagdown \quad (I)$$

The hydroxyl group can undergo further reaction with alkylene oxide to produce:

$$R''N\underset{\underset{\underset{R'}{|}}{(CH_2CHO)_yH}}{\overset{\overset{\overset{R'}{|}}{(CH_2CHO)_xH}}{\diagup}}\diagdown \quad (II)$$

wherein $x$ and $y$ are integers varying from 1 to about 200 preferably 1 to about 100.

The alkylene oxide which reacts with the amine as in reaction I to produce alkylene oxide-amine adduct need not necessarily be identical with the alkylene oxide which reacts as in reaction II. In other words, $R'$ need not be the same in both instances and may vary within the scope of definition of $R'$.

In the case of adducts of alkylene oxide with secondary amines the resulting adduct can be represented by the general formula:

$$\underset{R''''}{\overset{R'''}{\diagdown}}N-(CH_2\overset{\overset{R'}{|}}{C}HO)_zH$$

wherein $R'$, $R'''$ and $R''''$ are as previously designated and $z$ is an integer whose value is from about 1 to about 200, preferably 1 to about 100.

Alkylene amines of the formula $H_2NC_nH_{2n}NH_2$ are best exemplified by ethylene diamine, trimethylenediamine, tetramethylenediamine, and hexamethylenediamine.

The adduct of ethylenediamine with alkylene oxide can be represented by the general formula:

$$\underset{\underset{R'}{|}}{H(O\overset{\overset{R'}{|}}{C}HCH_2)_C}\diagdown\underset{H(O\overset{\overset{R'}{|}}{C}HCH_2)_E}{\diagup}NCH_2CH_2N\underset{\diagdown(CH_2\overset{\overset{R'}{|}}{C}HO)_FH}{\overset{\diagup(CH_2\overset{\overset{R'}{|}}{C}HO)_DH}{}}$$

wherein subscripts C, D, E and F are integers varying from 1 to about 100, preferably 1 to about 50, and wherein further the values of these integers are not necessarily the same.

Alkylene amines of the formula $H_2N(C_AH_{2A}NH)_BH$ can be exemplified by diethylenetriamine, triethylenetetramine, etc. The adduct produced by the reaction of alkylene oxide with diethylenetriamine, for example, can be represented by the general formula:

$$\underset{\underset{R'}{|}}{H(O\overset{R'}{C}HCH_2)_G}\diagdown\underset{H(O\overset{R'}{C}HCH_2)_I}{\diagup}NCH_2CH_2NCH_2CH_2N\underset{(\overset{R'}{C}H_2CHO)_JH\ (CH_2\overset{R'}{C}HO)_KH}{\overset{(CH_2\overset{R'}{C}HO)_HH}{}}$$

wherein subscripts G, H, I, J and K are integers varying from about 1 to about 100, preferably from 1 to about 50, and they are not necessarily equal to one another.

The adduct of triethylenetetramine and alkylene oxide may likewise be represented by the following general formula:

$$H(O\overset{R'}{C}HCH_2)_L\diagdown\ \diagup(CH_2\overset{R'}{C}HO)_MH$$
$$NCH_2CH_2NCH_2CH_2NCH_2CH_2N$$
$$H(O\overset{R'}{C}HCH_2)_N\ (CH_2\overset{R'}{C}HO)_OH\ (\overset{R'}{C}H_2CHO)_PH\ (CH_2\overset{R'}{C}HO)_QH$$

wherein subscripts L, M, N, O, P and Q are integers varying from 1 to about 100, preferably 1 to about 50, and they are not necessarily equal to one another.

The following examples further illustrate this invention.

Example 12

This example illustrates the properties of plasticized ethylene-acrylic acid copolymers containing 13 percent by weight acrylic acid and wherein the plasticizer is an adduct of ethylene diamine and propylene oxide. These properties are shown in Table II.

TABLE II

| Copolymer, wt. percent | 100 | 95 | 90 | 80 |
|---|---|---|---|---|
| Plasticizer, phr. | | 5 | 10 | 20 |
| Tensile Strength, p.s.i. | 4,000 | 3,400 | 3,100 | 2,600 |
| Elongation, percent | 620 | 550 | 580 | 600 |
| Stiffness, p.s.i. | 14,000 | 13,000 | 11,000 | 7,000 |

In Table II as well as in the following tables and examples, the test methods for determining the properties of the plasticized compositions were the same as the test methods designated at the end of Table I, supra.

Examples 13–19

The following examples in Table III illustrate the effect of several of the plasticizers of this invention on the sodium salt of copolymer of ethylene and acrylic acid containing 14 percent by weight acrylic acid. These sodium salts (ionomers) represent copolymers which have been 35 percent converted to the corresponding ionomers. The plasticized concentration in all examples were 10 phr.

The following examples illustrate the improvement in anti-static properties of the copolymers and ionomers resulting from the addition of the plasticizer of this invention. The effectiveness of an anti-static agent can be determined in one of the following several ways. It can be determined by measuring volume resistivity of the plasticized composition. The volume resistivity can be measured in conformity with the method set forth in ASTM 257–61. It is known that a material or composition becomes less prone to acquire and retain an electrostatic charge as its volume resistivity decreases. Therefore, if a sample containing an anti-static agent has a lower volume resistivity value than one without such an agent, then it will be less apt to acquire and retain an electrostatic charge. Volume resistivity is therefore a useful index to the effectiveness of a selected anti-static agent.

Another convenient method of testing the effectiveness of a selected anti-static agent is the so-called "cigarette ash test." According to this test a film of plasticized composition is rubbed against a wool cloth about 10 to 12 times and is then held about one inch above a small pile of fresh cigarette ashes. A material which has developed a static charge by the rubbing will cause the cigarette ashes to leap upwards and adhere to its surface. A visual comparison is then made to compare an unplasticized film with a film to which the plasticizer has been added.

Still another method of testing the effectiveness of a

TABLE III

| Example | Plasticizer | Melt Index, dg./min. | Stiffness, p.s.i. | Tensile Strength, p.s.i. | Elongation, percent | Tensile Impact, p.s.i. |
|---|---|---|---|---|---|---|
| Control | | 1.5 | 45,000 | 4,700 | 420 | 450 |
| 13 | Polypropylene glycol, MW 2025 | 2.8 | 34,000 | 3,000 | 310 | 420 |
| 14 | Adduct of 2 moles propylene oxide and n-hexylamine. | 4.1 | 31,000 | 4,000 | 440 | 420 |
| 15 | Adduct of 8 moles propylene oxide and n-hexylamine. | 3.8 | 19,000 | 3,500 | 530 | 440 |
| 16 | Adduct of propylene oxide and 1,2,6-hexane triol. | 3.6 | 27,000 | 3,600 | 500 | 360 |
| 17 | Adduct of 12 moles propylene oxide and triethanolamine. | 3.2 | 23,000 | 3,700 | 500 | 380 |
| 18 | Adduct of propylene oxide and diethylenetriamine. | 2.8 | 39,000 | 4,200 | 445 | 380 |
| 19 | Adduct of propylene oxide and sorbitol. | 3.2 | 43,000 | 4,400 | 460 | 460 |

Examples 20–22

The following examples illustrate in Table IV, the effect of some typical plasticizers of this invention upon the properties of ethylene-methacrylic acid copolymer containing 17 weight percent methacrylic acid. The concentration of the plasticizers in all examples were 10 phr.

selected anti-static agent involves the use of Keithley Model 610A electrometer and Keithley Model 2501 static detector head. This method involves initially inducing electric charge (measured in volts) into a film sample, and thereafter measuring the time required for the static charge to dissipate to 3000 volts. The better the anti-static proper-

TABLE IV

| Example | Plasticizer | Melt Index, dg./min. | Stiffness p.s.i. | Tensile Strength, p.s.i. | Elongation, percent | Tensile Impact, p.s.i. |
|---|---|---|---|---|---|---|
| Control | | 200 | 17,500 | 1,700 | 210 | 165 |
| 20 | Adduct of propylene oxide and n-hexylamine | 515 | 8,200 | 1,200 | 340 | 245 |
| 21 | Adduct of propylene oxide and ethylenediamine [1] | 265 | 7,900 | 1,400 | 430 | 225 |
| 22 | Adduct of propylene oxide and diethylenetriamine.[2] | 300 | 15,000 | 1,800 | 350 | 110 |

[1] Average molecular weight 535.    [2] Average molecular weight 500.

The following examples illustrate, in Table V, the effect of several of the plasticizers of this invention upon the ionomers (sodium salt) derived from 50% neutralization of copolymer of ethylene and methacrylic acid containing 10 weight percent methacrylic acid. The concentration of plasticizer in each example was 10 phr.

ties of the film, the less time is necessary to dissipate the induced charge to the desired level.

Examples 27–28

These examples illustrate, in Table VI, the effect of adduct of propylene oxide and n-hexylamine as anti-static

TABLE V

| Example | Plasticizer | Melt Index, dg./min. | Stiffness, p.s.i. | Strength, p.s.i. | Elongation percent |
|---|---|---|---|---|---|
| Control | | 2.4 | 27,000 | 3,700 | 400 |
| 23 | Polypropylene glycol, MW 2025 | 4.1 | 23,000 | 2,500 | |
| 24 | 8 moles propylene oxide adduct of hexylamine | 9.5 | 13,000 | 2,600 | 570 |
| 25 | Adduct of propylene oxide and 1, 2, 6-hexanetriol | 8.4 | 15,000 | 2,600 | 510 |
| 26 | 8 moles propylene oxide adduct of ehtylenediamine | 12.2 | 22,000 | 2,900 | 560 | agent in copolymers of ethylene and acrylic acid containing 13 weight percent acrylic acid.

TABLE VI

| Example | Plasticizer, p.h.r. | Volume Resistivity, ohms-cm. |
|---|---|---|
| Control | --------- | $1.8 \times 10^{17}$ |
| 27 | 10 | $1.3 \times 10^{12}$ |
| 28 | 20 | $1.1 \times 10^{12}$ |

*Examples 29–30*

These examples illustrate the effect of adduct of propylene oxide and ethylenediamine upon the anti-static properties of a copolymer of ethylene and acrylic acid containing 13 weight percent acrylic acid. The results are shown in Table VII.

TABLE VII

| Example | Plasticizer, p.h.r. | Volume Resistivity, ohms-cm. |
|---|---|---|
| Control | --------- | $4.6 \times 10^{13}$ |
| 29 | 10 | $1.0 \times 10^{10}$ |
| 30 | 20 | $4.0 \times 10^{8}$ |

In Examples 27–30 the plasticized compositions were also tested by the "cigarette ash test" and the results indicated that while the unplasticized films caused the ashes to leap upward, the plastisized film had relatively no effect upon the ash pile.

Although the control samples in Examples 27–28 on the one hand, and Extmples 29–30 on the other hand were the same, the measured volume resistivities were different. This is due to the fact that the measurements of volume resistivity for Examples 27 and 28 were made at a different day than the measurements made for Examples 29 and 30, and the value of the volume resistivity is effected by changes in atmospheric conditions such as temperature and humidity. Nevertheless, the measured values on each day indicate significant improvement in the anti-static properties.

*Examples 31–32*

These examples illustrate the improvements in the anti-static properties resulting from the addition of adduct of propylene oxide and ethylene diamine to a sodium salt (35% conversion) of ethylene-acrylic acid copolymer containing 14 weight percent copolymerized acrylic acid. The plasticizer concentration in both examples was 10 phr. and the molecular weights of the plasticizer in Examples 31 and 32 were 292 and 500, respectively. Both plasticized films showed improved anti-static properties when compared to the unplasticized film by the "cigarette ash test." Furthermore, the rate of dissipation of the initial induced charge was greater in the case of the plasticized films as measured by the Keithley Model 610A electrometer.

*Examples 33–35*

These examples illustrate the improvements in the anti-static properties resulting from the addition of tri(2-ethylhexyl)phosphate to ethylene-acrylic acid copolymer containing 13 weight percent copolymerized acrylic acid and 5phr. plasticized (Example 33), and to an ionomer derived from 35% neutralization (conversion) of copolymer of ethylene and acrylic acid containing 14 weight percent copolymerized acrylic acid and containing 5 phr. and 10 phr. of plasticizer, respectively (Examples 34 and 35).

The initial induced charge and the rate of dissipation of the electric charge were measured in all cases by Keithley Model 610A electrometer. All plasticized films exhibited considerable improvement in anti-static properties when compared to the corresponding unplasticized films. In the case of the copolymer, the unplasticized film had an initial induced charge of approximately 22,000 volts whereas the plasticized film had an initial induced charge of approximately 11,000 volts. The unplasticized film of the ionomer had an initial induced charge of about 11,000 volts and had dissipated only to about 8,500 volts in 25 minutes. The plasticized films of the ionomer (10 phr.) had an initial induced charge of about 10,000 volts and had dissipated to 3,000 volts in 18 minutes and to 2,000 volts in 25 minutes. The plasticized film containing 5 phr. plasticizer had an initial induced charge of about 9,600 volts and had dissipated to 6,000 volts in 25 minutes.

*Example 36*

This example illustrates the improvement in anti-static properties resulting from the addition of glycerol to a copolymer of ethylene-methacrylic acid containing 10 weight per cent methacrylic acid. The glycerol concentration was 10 phr.

*Example 37*

This example illustrates the effect of addition of glycerol-propylene oxide adduct upon the anti-static properties of an ionomer derived from 50% neutralization of copolymer of ethylene and acrylic acid which contains 13 weight percent acrylic acid. The plasticizer concentration was 10 phr.

In both Examples 36 and 37 the plasticized films exhibited superior anti-static properties than the unplasticized film by the "cigarette ash test" as well as Keithley Model 610A electrometer.

What is claimed is:
1. A novel homogeneous plasticized composition of (i) a material selected from the group consisting of copolymer of ethylene and acrylic acid and copolymer of ethylene and methacrylic acid, said copolymer containing from about 65 weight percent to about 99 weight percent copolymerized ethylene and (ii) a plasticizer selected from the group consisting of diols which conform to the formula:

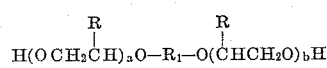

triols conforming to the formula:

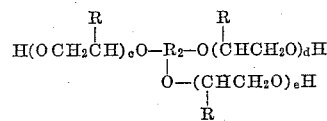

tetrols conforming to the formula:

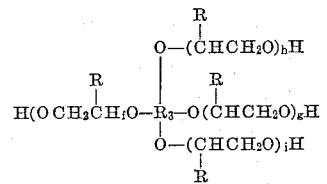

and hexols conforming to the formula:

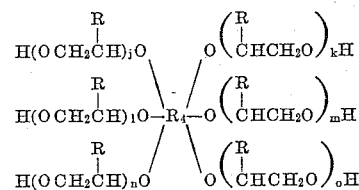

wherein R is selected from the group consisting of hydrogen and lower alkyl radical, $R_1$ is an alkylene radical having 2 to 6 carbon atoms, $R_2$ is a trivalent saturated aliphatic radical containing 3 to 8 carbon atoms, $R_3$ is a tetravalent saturated aliphatic radical containing 5 to 8 carbon atoms and $R_4$ is a hexavalent saturated aliphatic radical containing 6 carbon atoms and wherein $a$ and $b$ are integers from 0 to about 250, $c$, $d$ and $e$ are integers from 0 to about 25, $f$, $g$, $h$ and $i$ are integers varying from 0 to about 15 and $j$, $k$, $l$, $m$, $n$ and $o$ are integers from 0 to 12.

2. The homogeneous plasticized composition as in claim 1 wherein said material is a copolymer of ethylene and acrylic acid.

3. The homogeneous plasticized composition as in claim 1 wherein said material is a copolymer of ethylene and methacrylic acid.

4. The homogeneous plasticized composition as in claim 1 wherein said material is the ionomer derived from at least about 5 percent neutralization of said copolymers with a metal ion.

5. The homogeneous plasticized composition as in claim 1 wherein said material is the ionomer derived from neutralization of about 20 percent to about 60 percent of said copolymers with a metal ion.

6. The homogeneous plasticized composition as in claim 1 wherein the concentration of plasticizer is from 2 parts per hundred parts of resin to about 40 parts per hundred parts of resin.

7. The homogeneous plasticized composition as in claim 1 wherein the copolymer contains from about 5 weight percent to about 20 weight percent copolymerized acrylic acid.

8. The homogeneous plasticized composition as in claim 1 wherein said plasticizer is polyethylene glycol having an average molecular weight of at least about 200.

9. The homogeneous plasticized composition as in claim 1 wherein said plasticizer is polypropylene glycol having an average molecular weight of at least about 200.

10. The homogeneous plasticized composition as in claim 1 wherein said plasticizer is glycerol.

11. The homogeneous plasticized composition as in claim 1 wherein said plasticizer is hexane triol.

12. The homogeneous plasticized composition as in claim 1 wherein said plasticizer is sorbitol.

13. The homogeneous plasticized composition as in claim 1 wherein said plasticizer is polyethylene glycol having an average molecular weight of from about 300 to about 25,000.

14. The homogeneous plasticized composition as in claim 1 wherein said plasticizer is polypropylene glycol having an average molecular weight of from about 300 to about 25,000.

References Cited

UNITED STATES PATENTS

| | | | |
|---|---|---|---|
| 2,596,141 | 5/1952 | Gamrath et al. | 260—30.6 |
| 2,646,425 | 7/1953 | Barry | 260—94.9 |
| 2,891,029 | 6/1959 | Coler et al. | 260—32.6 |
| 2,891,030 | 6/1959 | Coler et al. | 260—32.6 |
| 2,980,643 | 4/1961 | Edelman et al. | 260—30.6 |
| 2,980,964 | 4/1961 | Dilke | 260—33.4 |
| 3,206,419 | 9/1965 | Pritchard et al. | 260—33.4 |
| 3,264,272 | 8/1966 | Rees | 260—88.1 |

OTHER REFERENCES

Stille: Introduction to Polymer Chemistry; John Wiley and Sons, Inc.; 1962; page 61.

JULIUS FROME, *Primary Examiner.*

MORRIS LIEBMAN, *Examiner.*

L. T. JACOBS, *Assistant Examiner.*